United States Patent [19]

Wong et al.

[11] 4,405,772

[45] Sep. 20, 1983

[54] BUTENE-1-VINYLCYCLOHEXENE COPOLYMER

[75] Inventors: Pui K. Wong, Katy; Carl L. Willis; Thomas F. Brownscombe, both of Houston, all of Tex.

[73] Assignee: Shell Oil Company, Houston, Tex.

[21] Appl. No.: 391,202

[22] Filed: Jun. 23, 1982

[51] Int. Cl.³ .................................... C08F 210/08
[52] U.S. Cl. ............................ 526/308; 526/159; 528/496
[58] Field of Search ........................ 526/308, 159

[56] References Cited

FOREIGN PATENT DOCUMENTS 1101435 1/1968 United Kingdom .

Primary Examiner—Stanford M. Levin

[57] ABSTRACT

Solid copolymers of butene-1 and 4-vinylcyclohexene prepared by copolymerizing the monomers in the presence of a titanium halide coordination catalyst have an unobvious balance of properties including a broader molecular weight distribution, shorter crystallization half-time, greater isotacticity and greater crystallinity than butene-1 homopolymers prepared with identical catalysts.

6 Claims, No Drawings

BUTENE-1-VINYLCYCLOHEXENE COPOLYMER

FIELD OF THE INVESTIGATION

This invention relates to a novel copolymer of butene-1. More particularly, this invention relates to a novel copolymer of butene-1 and 4-vinylcyclohexene.

BACKGROUND OF THE INVENTION

Thermoplastic, predominantly isotactic homo- and copolymers of 1-butene, referred to herein and in the trade as "polybutylene" or "poly-1-butene", are well known materials. Isotactic polybutylene is the subject of U.S. Pat. No. 3,435,017 of Natta et al. The properties and preparation of isotactic polybutylene are described, for example, in "Encyclopedia of Chemical Technology", edited by Kirk-Othmer, 2nd Ed., Supp. Vol., pp. 773–787. Methods for producing such polybutylene are disclsoed, i.e., in U.S. Pat. Nos. 3,362,940 and 3,464,962. Thermoplastic, predominantly isotactic butene-1 homopolymers of the type heretofore described in the literature, e.g., in U.S. Pat. Nos. 3,362,940 and 3,435,017, and produced commercially, are referred to herein as "conventional" polybutylene.

Conventional polybutylene is produced by contact of 1-butene with coordination catalysts which are generally referred to as Ziegler-Natta catalysts. Broadly, such catalysts are the products of contacting a compound of a transitional metal of Group IV of the Periodic Table of Elements or of some other transition metals with an organometallic compound of a metal of Groups I–III. For convenience of reference herein, the transition metal-containing components, which are typically solid, are referred to as "procatalysts", the organometallic compounds as "co-catalysts", and any additional stereoregulating compounds as "selectivity control agents", abbreviated "SCA". Commercial Ziegler-Natta catalysts are designed to be highly stereoregulating in order to produce highly isotactic polyolefins.

Copolymers of butene-1 with various other monomers such as ethylene and propylene are well known. Such copolymers are useful to improve specific properties. For example, butene-1/ethylene copolymers have a better tear strength balance and heat seal. However, such copolymers also typically have a reduced crystallinity since the polymer backbone regularity is reduced. Other comonomers have also been investigated in the past. For example, U.K. Pat. No. 1,101,435 describes copolymers of butene-1 with 1-olefin monomers such as vinyl cyclopropane, vinyl cyclobutane, vinyl cyclopentane, vinyl cyclohexane, 4-vinylcyclohexene, allyl cyclohexane, allyl benzene and styrene. The copolymers described in the U.K. patent have a stable Type II crystalline form and contain 5 or preferably 10% or more by weight of the 1-olefin comonomer. These copolymers, however, are not attractive commercially since they have lower crytallinity than corresponding homopolymers.

SUMMARY OF THE INVENTION

The present invention relates to a novel copolymer of butene-1 having an unobvious balance of properties. More particularly, the present invention comprises a solid copolymer of butene-1 and about 0.1 to about 2.0 mole percent 4-vinylcyclohexene, prepared by copolymerizing said butene-1 monomer and said 4-vinylcyclohexene monomer in the presence of a titanium halide coordination catalyst, said copolymer having an initial form II crystalline state which transforms to a stable form I crystalline state, and, as compared to butene-1 homopolymers prepared with identical catalysts, a broader molecular weight distribution, shorter crystallization half-time, greater isotacticty as measured by $^{13}C$NMR and greater crystallinity as measured by x-ray diffraction.

In view of the slow rate of polymerization of the 4-vinylcyclohexene, the present copolymers most likely have single 4-vinylcyclohexene units distributed randomly over the polymer chain. Further, such copolymers may be further derivatized with other materials in view of the presence of unsaturation sites.

DETAILED DESCRIPTION OF THE INVENTION

The amounts of 4-vinylcyclohexene incorporated in the copolymer is between about 0.1 mole percent and 2.0 mole percent, preferably between about 0.1 mole percent and about 1.0 mole percent. In order to obtain these levels, it is necessary to have a higher ratio of 4-vinylcyclohexene to butene-1 monomers in the polymerization reactor. The molar ratio of 4-vinylcyclohexene monomer to butene-1 monomer is about 1:99 to about 25:75, preferably 5:95 to 15:85. It is particularly surprising that the low levels of 4-vinylcyclohexene in the copolymer have such a significant effect on copolymer properties.

A number of different coordination catalysts of the Ziegler-Natta type are useful in making the copolymers of this invention. Broadly, such catalysts comprise a pro-catalyst which is a solid compound of a transistion metal of group IV to VIII of the Periodic Table and a cocatalyst which is an alkyl compound, including alkyl halides and hydrides, of a metal of groups I to III. It is now well known that only a limited number of these compounds are practical for effectively converting a given monomer into a desired polymer. In general, the same catalysts which are effective for the polymerization of a butene-1 monomer feed in a conventional polymerization process are also effective for the same conversion in the process of this invention.

Ziegler-Natta coordination catalysts are discussed in detail in the book "Ziegler-Natta Catalysts and Polymerizations" by John Boor, Jr., Academic Press, 1979 and in numerous patents and review articles, including those cited by Boor.

Preferred procatalysts are violet $TiCl_3$. Catalysts of the type of violet $TiCl_3$ are preferably employed with alkyl aluminum halides, typically diethyl aluminum chloride (DEAC), as cocatalyst or trialkyl aluminums such as triethyl aluminum ($Et_3Al$).

A much preferred catalyst system is that obtained by employing Stauffer Chemical Company $TiCl_3AA$ procatalyst, particularly Type 1.1 procatalyst. This procatalyst is preferably employed with DEAC or $Et_3Al$. Such coordination catalysts are well known to those skilled in the art, and their preparation need not be detailed here. Preferred molar ratios of $TiCl_3$ to $Et_3Al$ or DEAC are 1:1 to 1:10, more preferably 1:3 to 1:6.

The polymerization is preferably conducted as a solution polymerization process, using butene-1 as the reaction medium. However, it may be conducted in liquid butene-1 at conditions under which the polymer is produced as a solid in a so-called slurry polymerization.

The polymerization may be carried out in batch or continuous modes.

Polymerization, as well as catalyst preparation, is carried out in the absence of air and water or in the presence of only very limited amounts of these, since otherwise the catalyst would be deactivated. Desired polymerization temperatures are between 20° C. and 100° C., preferably between 40° C. and 80° C. If desired, hydrogen may be added in order to control the molecular weight.

The catalysts employed in the production of the subject copolymers may be of sufficiently high activity that no product deashing step is required. If catalyst residues are to be deactivated and removed, this may be accomplished by conventional means employed in cleanup of olefin polymers produced over such catalysts, e.g., by contact with an alcohol, followed by extraction with water.

To illustrate the instant invention, the following illustrative embodiments are given. It is to be understood, however, that the embodiments are given for the purpose of illustration only and the invention is not to be regarded as limited to any of the specific materials or conditions used in the specific embodiments.

ILLUSTRATIVE EMBODIMENT I

In this embodiment, various polymerizations were made using a coordination catalyst system based on Stauffer $TiCl_3AA$ Type 1.1 procatalyst and either triethyl aluminum or diethyl aluminum chloride. These catalyst systems are termed $TiCl_3AA/Et_3Al$ and $TiCl_3AA/DEAC$ respectively.

Polymerization

Unless otherwise stated, all polymerizations were carried out in bulk in a 300 ml autoclave using the two-component $TiCl_3AA/Et_3Al$ or $TiCl_3AA/DEAC$ at 60° C. for 90 minutes. Prior to characterization, the polymers were deashed by dissolution in hot isooctane/butanol (50/1 by volume) and reprecipitated in cold methanol. The results are summarized in Table 1 and 2. Yields of $4VCH^{--}-C_4^{--}$ copolymers ranged from 700 to 2,000 g polymer/g-cat-h based on $TiCl_3AA/Et_3Al$ systems and decreased with increasing amounts of $4VCH^{--}$ in monomer feeds. By comparison, homopolymerization of $c_4^{--}$ gave ~3500 g polymer/g-cat-h in the present study.

Copolymer Composition

The various copolymers were analyzed by $^{13}C$ NMR spectra of the polymers employing a Bruker WM-360 spectrometer. The $C_4^{---}4VCH^{--}$ copolymer compositions were calculated from the relative intensities of $sp^2$ and $sp^3$ proton resonances assuming all $4VCH^{--}$ monomers polymerized exclusively through the vinyl double bond. Since $4VCH^{--}$ has been shown to polymerize by a combination of vinyl- and cyclo-addition with the latter process consuming both double bonds, the actual amount of $4VCH^{--}$ incorporated may be slightly higher. With a 15 mole % of $4VCH^{--}$ monomer feed composition, the resulting copolymer has a calculated composition of ~1 mole % $4VCH^{--}$. Vinylcyclohexane (VCH) was found to exhibit similar low copolymerization reactivity in its copolymerization with $C_4^{--}$.

Molecular Weight Distribution

The molecular weight distribution of $C_4^{---}4VCH^{--}$ copolymers were broader than those of corresponding $C_4^{--}$ homopolymers and appears to broaden with increasing mole fraction of $4VCH^{--}$ in monomer feeds. For polymers prepared with $TiCl_3AA/Et_3Al$ and Q value of the copolymers increased from 13.2 at 5 mole % $4VCH^{--}$ in feed to 16.7 at 15 mole % $4VCH^{--}$. By comparison the corresponding homopolymer of $C_4^{--}$ and $C_4^{---}4VCH^{--}$ copolymers have Q ranging from 7.8 to 11.4 and 9.9 to 12.6, respectively.

Crystallinity and Tacticity

Relative to poly-1-butene, copolymers of $4VCH^{--}$ made with $TiCl_3AA/Et_3Al$ catalysts were more isotactic (% iso=79–82 and % def=13–14) and crystalline (% crystallinity ~41 to 44); whereas copolymers of VCH were slightly less crystalline but had tacticity parameters (% iso=64–68, % def=21–42) comparable to those of corresponding polybutene (% iso=67, % def=29). A possible explanation for the higher stereoregularity in $4VCH^{--}$ copolymers is the selective inhibition of atactic sites by $4VCH^{--}$ via chelation. X-ray analysis of freshly compression-molded and pressure aged copolymer films showed no inhibition of the transformation of Form II crystalline state to Form I; such an effect has been reported in U.K. Pat. No. 1,101,435 for butene copolymers containing higher amounts (>5 mole %) of bulky comonomers. The tensile properties of the butene polymers showed the expected increase in stiffness with crystallinity.

Summary

Copolymers of $C_4^{---}4VCH^{--}$ have broader molecular weight distribution, higher degree of isotacticity and crystallinity than homopolybutene and copolymers of $C_4^{--}$ and vinylcyclohexane prepared under identical conditions.

TABLE 1

POLYMERIZATION DATA FOR 1-BUTENE COPOLYMERS POLYMERIZATION[a]

| RUN | COMONOMER | MOLE % IN FEED | MOLE % IN POLYMER | TiCl$_3$ (MMOLE) | DEAC (MMOLE) | Et$_3$Al (MMOLE) | G POLYMER G-CAT-H |
|---|---|---|---|---|---|---|---|
| 124 | NONE | 0 | 0 | 0.075 | — | 0.45 | 3396 |
| 125 | NONE | 0 | 0 | 0.075 | — | 0.45 | 3569 |
| 119 | 4VCH= | 5 | <1 | 0.1 | — | 0.6 | 1907 |
| 108 | 4VCH= | 5 | — | 0.4 | — | 2.4 | 533 |
| 114 | 4VCH= | 10 | <1 | 0.1 | — | 0.6 | 990 |
| 116 | 4VCH= | 10 | — | 0.1 | — | 0.6 | 997 |
| 117 | 4VCH= | 15 | ~1 | 0.1 | — | 0.6 | 715 |
| 118 | 4VCH= | 15 | — | 0.1 | — | 0.6 | 752 |
| 153 | VCH[b] | 5 | ~0.2 | 0.075 | — | 0.45 | 2200 |
| 163 | VCH[c] | 15 | ~1 | 0.15 | — | 0.9 | 5824 |
| 148 | NONE | 0 | 0 | 0.1 | 0.6 | — | 354 |

TABLE 1-continued
POLYMERIZATION DATA FOR 1-BUTENE COPOLYMERS

| RUN | COMONOMER | POLYMERIZATION[a] MOLE % IN FEED | MOLE % IN POLYMER | TiCl3 (MMOLE) | DEAC (MMOLE) | Et3Al (MMOLE) | G POLYMER G-CAT-H |
|---|---|---|---|---|---|---|---|
| 135 | 4VCH= | 15 | <0.6 | 0.3 | 3.6 | — | 252 |

[a] Reaction Temp = 60° C.; Residence Time = 90 min; $C_4^=$ + Comonomer = 1.7 mole; $H_2$ = 0.4 mmol.
[b] Residence Time = 15 min.
[c] Residence Time = 10 min.

TABLE 2
CHARACTERIZATION DATA OF 1-BUTENE COPOLYMERS

| | GPC | | | 13C NMR | | DSC CRYST. TEMP (°C.) | DSC CRYST. HALF-TIME AT 77° C. (MIN) | X-RAY % CRYST.[e] (FRESHLY MOLDED) | X-RAY % CRYST.[f] (PRESSURE AGED) | TENSILE PROPERTIES[g] YOUNG'S MODULUS (PSI) | TENSILE BREAK (PSI) | % ELONGATION |
|---|---|---|---|---|---|---|---|---|---|---|---|---|
| RUN | $\bar{M}n$ ($\times 10^{-3}$) | $\bar{M}w$ ($\times 10^{-3}$) | Q | % ISO | % DEF. | | | | | | | |
| 124 | 111 | 1,265 | 11.4 | 67 | 29 | 63.5[d] 47.5 | 6.7 | | | 5,910 | 2,650 | 438 |
| 125 | 128 | 998 | 7.8 | | | | | 27.7 | 32.2 | | | |
| 119 | 95.4 | 1,259 | 13.2 | | | | | | 42.2 | 12,780 | 3,420 | 344 |
| 108 | | | | 80 | 14 | 60 | 2.7 | | | 12,910 | 3,030 | 320 |
| 114 | 99.2 | 1,339 | 13.5 | 82 | 13 | 61 | 3.1 | 31.8 | 43.5 | 14,540 | 3,910 | 423 |
| 116 | | | | | | | | | | | | |
| 117 | 72 | 1,202 | 16.7 | 79 | 14 | 62.5 | 1.9 | 30.5 | 41.9 | 13,710 | 4,000 | 440 |
| 118 | | | | | | | | | | | | |
| 153 | 91.1 | 910 | 9.9 | 64.5 | 24 | | | 19.7 | 28.3 | 6,627 | 1,828 | 430 |
| 163 | 74.1 | 933 | 12.6 | 68.1 | 21 | | | | | 3,895 | 2,313 | 547 |
| 148 | 135 | 1508 | 11.2 | 93.8 | 4.7 | | | | | | | |
| 135 | 114 | 1572 | 13.8 | 94.1 | 3.1 | | | | | | | |

[d] Two maxima in melting peak.
[e] All Form II.
[f] All Form I.
[g] Average of three runs using ⅜" × 2¾" × .021" samples.

What is claimed is:

1. A solid copolymer of butene-1 and about 0.1 and about 2.0 mole percent 4-vinylcyclohexene, prepared by copolymerizing said butene-1 monomer and said 4-vinylcyclohexene monomer in the presence of a titanium halide coordination catalyst, said copolymer having an initial form II crystalline state which transforms to a stable form I crystalline state, and, as compared to butene-1 homopolymers prepared with identical catalysts, a broader molecular weight distribution, shorter cyrstallization half-time, greater isotacticity as measured by $^{13}C$ NMR and greater crystallinity as measured by x-ray diffraction.

2. The copolymer of claim 1 wherein said copolymer has a Q value of 13 or greater.

3. The copolymer of claim 1 wherein said catalyst is a titanium trichloride/trialkyl aluminum coordination catalyst.

4. The copolymer of claim 3 wherein said catalyst is a titanium trichloride/triethyl aluminum coordination catalyst.

5. The copolymer of claim 1 wherein said catalyst is a titanium trichloride/diethyl aluminum chloride coordination catalyst.

6. The copolymer of claims 3 or 5 wherein hydrogen is present during said copolymerization.

* * * * *